(12) United States Patent
Paczkowski et al.

(10) Patent No.: US 12,489,764 B2
(45) Date of Patent: Dec. 2, 2025

(54) CODE INJECTION PREVENTION FOR COMMUNICATION DEVICES

(71) Applicant: T-Mobile USA, Inc., Bellevue, WA (US)

(72) Inventors: Lyle Walter Paczkowski, Mission Hills, KS (US); Marouane Balmakhtar, Fairfax, VA (US); George Jason Schnellbacher, Leawood, KS (US)

(73) Assignee: T-Mobile USA, Inc., Bellevue, WA (US)

( * ) Notice: Subject to any disclaimer, the term of this patent is extended or adjusted under 35 U.S.C. 154(b) by 236 days.

(21) Appl. No.: 18/486,096

(22) Filed: Oct. 12, 2023

(65) Prior Publication Data

US 2025/0126133 A1    Apr. 17, 2025

(51) Int. Cl.
*H04L 9/40* (2022.01)
*G16Y 40/50* (2020.01)
*H04L 41/16* (2022.01)

(52) U.S. Cl.
CPC .......... *H04L 63/1416* (2013.01); *G16Y 40/50* (2020.01); *H04L 41/16* (2013.01)

(58) Field of Classification Search
None
See application file for complete search history.

(56) References Cited

U.S. PATENT DOCUMENTS

| | | | |
|---|---|---|---|
| 10,382,203 B1 | 8/2019 | Loladia et al. | |
| 10,484,477 B2 | 11/2019 | Nasir et al. | |
| 10,627,882 B2 | 4/2020 | Swierk et al. | |
| 10,721,274 B1 | 7/2020 | Prasad | |
| 10,764,374 B1 | 9/2020 | Marquardt et al. | |
| 10,841,303 B2 | 11/2020 | Bowling | |
| 10,993,101 B2 | 4/2021 | Macieira | |
| 11,481,509 B1 | 10/2022 | Prasad et al. | |
| 11,586,853 B2 | 2/2023 | Iyer et al. | |
| 2020/0059976 A1 | 2/2020 | Bhatia et al. | |

(Continued)

FOREIGN PATENT DOCUMENTS

| CN | 109559476 A | 4/2019 |
|---|---|---|
| CN | 107124433 B | 8/2019 |

(Continued)

*Primary Examiner* — Chris Parry
*Assistant Examiner* — Abderrahmen Chouat
(74) *Attorney, Agent, or Firm* — Perkins Coie LLP

(57) ABSTRACT

Techniques related to the management of communication devices using a combination of local and centralized blockchains to enable the detection of state changes that deviate from the expected behaviors are disclosed. In one example aspect, a method for detecting code injection activity in communication devices by a machine learning based platform includes determining, by a verification system, baseline information about a communication device; detecting a state change of the communication device, responsive to the state change of the communication device; appending, by the verification system, a current-state block representing the state change to a prior-state block representing a previous state of the communication device in a blockchain; and detecting whether a suspicious attack has occurred by comparing the payload of the current-state block to the baseline information.

20 Claims, 7 Drawing Sheets

(56) References Cited

U.S. PATENT DOCUMENTS

| | | | |
|---|---|---|---|
| 2020/0211721 | A1 | 7/2020 | Ochoa et al. |
| 2020/0380129 | A1* | 12/2020 | Dawson .................... G06F 1/28 |
| 2022/0108028 | A1* | 4/2022 | Gorog ................... H04L 9/0827 |
| 2023/0164236 | A1 | 5/2023 | Tov et al. |
| 2024/0080673 | A1* | 3/2024 | Newman ............... H04W 12/71 |

FOREIGN PATENT DOCUMENTS

| | | |
|---|---|---|
| CN | 106708451 B | 4/2020 |
| CN | 107613576 B | 5/2020 |
| CN | 107888605 B | 11/2020 |
| CN | 112149120 A | 12/2020 |
| CN | 112153088 A | 12/2020 |
| CN | 212367305 U | 1/2021 |
| CN | 112464190 A | 3/2021 |
| CN | 112436940 B | 4/2021 |
| CN | 112511653 B | 5/2021 |
| CN | 107895111 B | 6/2021 |
| CN | 107251530 B | 7/2021 |
| CN | 107862010 B | 8/2021 |
| CN | 110505196 B | 8/2021 |
| CN | 112398859 B | 2/2022 |
| CN | 111581036 B | 4/2022 |
| CN | 112600792 B | 4/2022 |
| CN | 110505312 B | 5/2022 |
| CN | 112073265 B | 5/2022 |
| CN | 110392014 B | 8/2022 |
| CN | 111447303 B | 9/2022 |
| CN | 110730063 B | 11/2022 |
| CN | 110248417 B | 4/2023 |
| CN | 111741513 B | 4/2023 |
| CN | 111565377 B | 8/2023 |
| DE | 102019126686 B4 | 1/2022 |
| EP | 3685276 A1 | 7/2020 |
| JP | 7132931 B2 | 8/2022 |
| KR | 20180025887 A | 3/2018 |
| WO | 2014131029 A2 | 8/2014 |
| WO | 2016140912 A1 | 9/2016 |
| WO | 2018208295 A1 | 11/2018 |
| WO | 2019118503 A1 | 6/2019 |

\* cited by examiner

CODE INJECTION PREVENTION FOR COMMUNICATION DEVICES

BACKGROUND

Generative Artificial Intelligence (AI) tools, such as Large Language Models (LLMs), bring increased efficiency to organizations but also present security concerns due to the improved generative capabilities.

BRIEF DESCRIPTION OF THE DRAWINGS

Detailed descriptions of implementations of the present invention will be described and explained through the use of the accompanying drawings.

Figure 1:
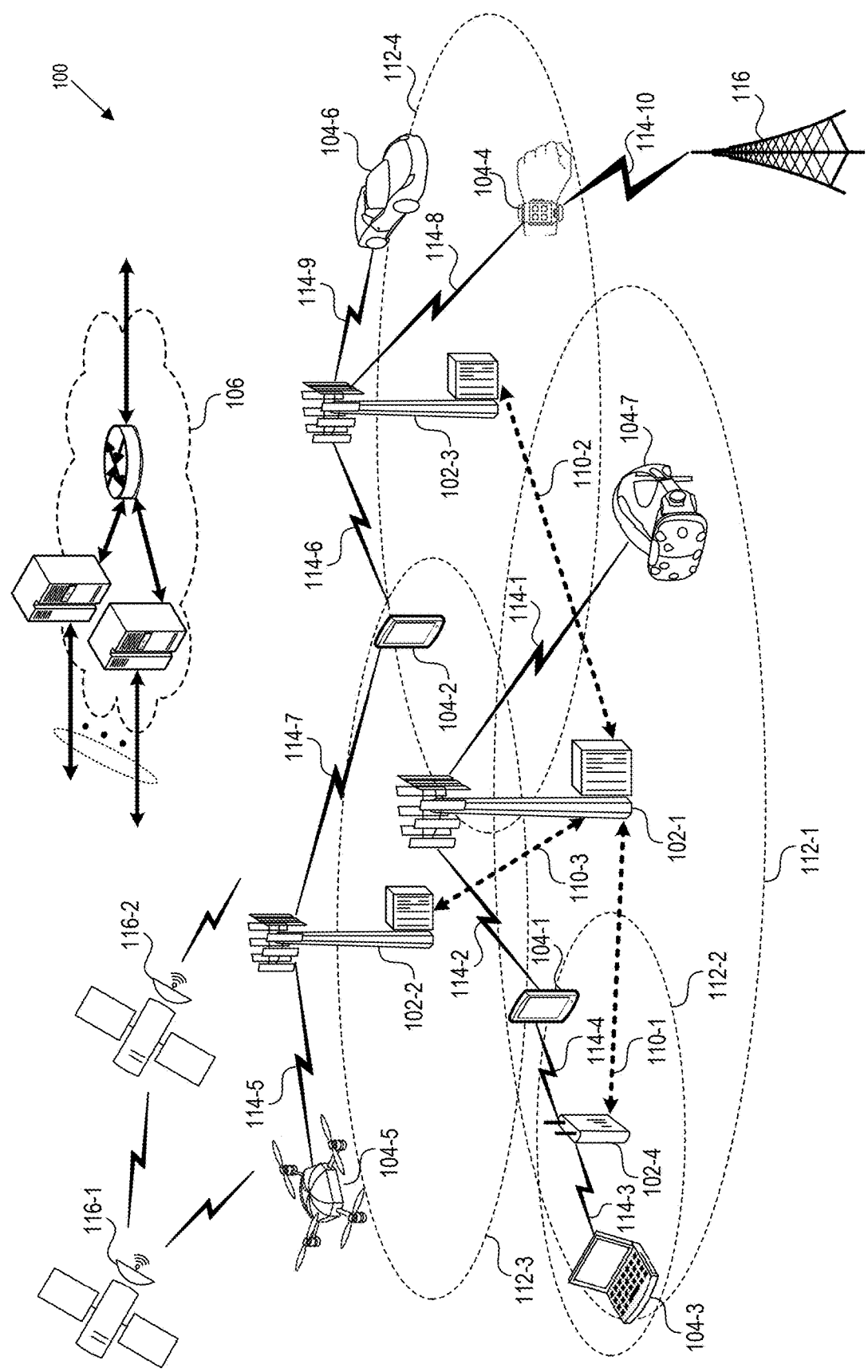
FIG. 1 is a block diagram that illustrates a wireless telecommunication network in which aspects of the disclosed technology are incorporated.

The technologies described herein will become more apparent to those skilled in the art by studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

With the development of communication technologies, an increasing number of devices, including but not limited to desktop computers, mobile phones, consumer electronics, etc., can be connected to networks and make "smart" decisions with respect to their operations. For example, the Internet-of-Things (IoT) is a term that refers to objects that are connected to the Internet. Advances in technologies such as sensors, cloud computing, and wireless communications enable a wide variety of IoT devices, ranging from household appliances, automobiles, to industrial tools. In particular, the Internet of Autonomous Things (IoAT), also known as Autonomous Things (AuT), is a concept that enables autonomous devices to connect to networks and share information without much human intervention. Some of the example IoAT devices include robotics, autonomous vehicles, drones, and smart home devices.

Recent progress in deep learning and artificial intelligence (AI) is the foundation for autonomous (or otherwise referred to as "smart") applications. Autonomous machines run on AI software programs that allow them to operate without human oversight. However, these AI software programs can also become open end points as potential security weaknesses. For example, with the development of Large Language Models (LLMs), a family of neural networks that are pre-trained using massive datasets of both natural and programming languages, becomes a security concern. LLMs are recent advances in deep learning models to work on human languages, including programming languages used by human beings. LLM systems can be deployed publicly for general use (e.g., ChatGPT) or deployed privately or in a hybrid fashion to be suitable for enterprise use. LLMs can be used to generate malicious code that is injected into applications to gain control of the applications.

Remote control of IoT devices through a cellular wireless network might be intercepted by an AI-based hacker system. The AI-based hacker system could hijack the communication, generate and inject program code into the IoAT devices, and take control of the device. The hacker system would then provide false information about the system to a user (or a device operation) or performs a false action on the IoAT device(s).

With the advancement of blockchain technology, many aspects of the communication network, such as the usage data and core network functions, can be managed in a blockchain format. This patent document discloses techniques that leverage the blockchain technology to provide verification of communication devices using a combination of local and centralized ledgers so as to monitor and verify the appropriate behavior of communication devices. The disclosed techniques establish a set of baseline information representing the expected behaviors of the communication devices to detect state changes that deviate from the expectations, thereby enabling the prevention of code injections from AI-based systems.

The description and associated drawings are illustrative examples and are not to be construed as limiting. For example, the descriptions below focus on wireless communication systems and IoAT devices as examples, but the disclosed techniques can be similarly applied to wired networks with conventional communication devices, such as Personal Computers (PCs), consumer electronics, etc. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail, to avoid unnecessarily obscuring the descriptions of examples.

Wireless Communication System

Some embodiments are described with reference to Third Generation Partnership Project (3GPP) Fifth Generation (5G) New Radio (NR) or Sixth Generation (6G) standard for ease of understanding and the described technology may be implemented in different wireless system that implement protocols other than the NR or 6G protocol.

FIG. 1 is a block diagram that illustrates a wireless telecommunication network 100 ("network 100") in which aspects of the disclosed technology are incorporated. The network 100 includes base stations 102-1 through 102-4

(also referred to individually as "base station 102" or collectively as "base stations 102"). A base station is a type of network access node (NAN) that can also be referred to as a cell site, a base transceiver station, or a radio base station. It is noted that the base station can also provide wired access to communication devices. The network 100 can include any combination of NANs including an access point, radio transceiver, gNodeB (gNB), NodeB, eNodeB (eNB), Home NodeB or Home eNodeB, or the like. In addition to being a wireless wide area network (WWAN) base station, a NAN can be a wireless local area network (WLAN) access point, such as an Institute of Electrical and Electronics Engineers (IEEE) 802.11 access point.

The NANs of a network 100 formed by the network 100 also include wireless devices 104-1 through 104-7 (referred to individually as "wireless device 104" or collectively as "wireless devices 104") and a core network 106. The wireless devices 104 can correspond to or include network 100 entities capable of communication using various connectivity standards. For example, a 5G communication channel can use millimeter wave (mmW) access frequencies of 28 GHz or more. In some implementations, the wireless device 104 can operatively couple to a base station 102 over a long-term evolution/long-term evolution-advanced (LTE/LTE-A) communication channel, which is referred to as a 4G communication channel.

The core network 106 provides, manages, and controls security services, user authentication, access authorization, tracking, internet protocol (IP) connectivity, and other access, routing, or mobility functions. The base stations 102 interface with the core network 106 through a first set of backhaul links (e.g., S1 interfaces) and can perform radio configuration and scheduling for communication with the wireless devices 104 or can operate under the control of a base station controller (not shown). In some examples, the base stations 102 can communicate with each other, either directly or indirectly (e.g., through the core network 106), over a second set of backhaul links 110-1 through 110-3 (e.g., X1 interfaces), which can be wired or wireless communication links.

The base stations 102 can wirelessly communicate with the wireless devices 104 via one or more base station antennas. The cell sites can provide communication coverage for geographic coverage areas 112-1 through 112-4 (also referred to individually as "coverage area 112" or collectively as "coverage areas 112"). The coverage area 112 for a base station 102 can be divided into sectors making up only a portion of the coverage area (not shown). The network 100 can include base stations of different types (e.g., macro and/or small cell base stations). In some implementations, there can be overlapping coverage areas 112 for different service environments (e.g., Internet-of-Things (IoT), mobile broadband (MBB), vehicle-to-everything (V2X), machine-to-machine (M2M), machine-to-everything (M2X), ultra-reliable low-latency communication (URLLC), machine-type communication (MTC), etc.).

The network 100 can include a 5G network 100 and/or an LTE/LTE-A or other network. In an LTE/LTE-A network, the term "eNBs" is used to describe the base stations 102, and in 5G new radio (NR) networks, the term "gNBs" is used to describe the base stations 102 that can include mmW communications. The network 100 can thus form a heterogeneous network 100 in which different types of base stations provide coverage for various geographic regions. For example, each base station 102 can provide communication coverage for a macro cell, a small cell, and/or other types of cells. As used herein, the term "cell" can relate to a base station, a carrier or component carrier associated with the base station, or a coverage area (e.g., sector) of a carrier or base station, depending on context.

A macro cell generally covers a relatively large geographic area (e.g., several kilometers in radius) and can allow access by wireless devices that have service subscriptions with a wireless network 100 service provider. As indicated earlier, a small cell is a lower-powered base station, as compared to a macro cell, and can operate in the same or different (e.g., licensed, unlicensed) frequency bands as macro cells. Examples of small cells include pico cells, femto cells, and micro cells. In general, a pico cell can cover a relatively smaller geographic area and can allow unrestricted access by wireless devices that have service subscriptions with the network 100 provider. A femto cell covers a relatively smaller geographic area (e.g., a home) and can provide restricted access by wireless devices having an association with the femto unit (e.g., wireless devices in a closed subscriber group (CSG), wireless devices for users in the home). A base station can support one or multiple (e.g., two, three, four, and the like) cells (e.g., component carriers). All fixed transceivers noted herein that can provide access to the network 100 are NANs, including small cells.

The communication networks that accommodate various disclosed examples can be packet-based networks that operate according to a layered protocol stack. In the user plane, communications at the bearer or Packet Data Convergence Protocol (PDCP) layer can be IP-based. A Radio Link Control (RLC) layer then performs packet segmentation and reassembly to communicate over logical channels. A Medium Access Control (MAC) layer can perform priority handling and multiplexing of logical channels into transport channels. The MAC layer can also use Hybrid ARQ (HARQ) to provide retransmission at the MAC layer, to improve link efficiency. In the control plane, the Radio Resource Control (RRC) protocol layer provides establishment, configuration, and maintenance of an RRC connection between a wireless device 104 and the base stations 102 or core network 106 supporting radio bearers for the user plane data. At the Physical (PHY) layer, the transport channels are mapped to physical channels.

Wireless devices can be integrated with or embedded in other devices. As illustrated, the wireless devices 104 are distributed throughout the network 100, where each wireless device 104 can be stationary or mobile. For example, wireless devices can include handheld mobile devices 104-1 and 104-2 (e.g., smartphones, portable hotspots, tablets, etc.); laptops 104-3; wearables 104-4; drones 104-5; vehicles with wireless connectivity 104-6; head-mounted displays with wireless augmented reality/virtual reality (AR/VR) connectivity 104-7; portable gaming consoles; wireless routers, gateways, modems, and other fixed-wireless access devices; wirelessly connected sensors that provide data to a remote server over a network; IoT devices such as wirelessly connected smart home appliances; etc.

A wireless device (e.g., wireless devices 104) can be referred to as a user equipment (UE), a customer premises equipment (CPE), a mobile station, a subscriber station, a mobile unit, a subscriber unit, a wireless unit, a remote unit, a handheld mobile device, a remote device, a mobile subscriber station, a terminal equipment, an access terminal, a mobile terminal, a wireless terminal, a remote terminal, a handset, a mobile client, a client, or the like.

A wireless device can communicate with various types of base stations and network 100 equipment at the edge of a network 100 including macro eNBs/gNBs, small cell eNBs/gNBs, relay base stations, and the like. A wireless device can also communicate with other wireless devices either within or outside the same coverage area of a base station via device-to-device (D2D) communications.

The communication links 114-1 through 114-9 (also referred to individually as "communication link 114" or collectively as "communication links 114") shown in network 100 include uplink (UL) transmissions from a wireless device 104 to a base station 102 and/or downlink (DL) transmissions from a base station 102 to a wireless device 104. The downlink transmissions can also be called forward link transmissions while the uplink transmissions can also be called reverse link transmissions. Each communication link 114 includes one or more carriers, where each carrier can be a signal composed of multiple sub-carriers (e.g., waveform signals of different frequencies) modulated according to the various radio technologies. Each modulated signal can be sent on a different sub-carrier and carry control information (e.g., reference signals, control channels), overhead information, user data, etc. The communication links 114 can transmit bidirectional communications using frequency division duplex (FDD) (e.g., using paired spectrum resources) or time division duplex (TDD) operation (e.g., using unpaired spectrum resources). In some implementations, the communication links 114 include LTE and/or mmW communication links.

In some implementations of the network 100, the base stations 102 and/or the wireless devices 104 include multiple antennas for employing antenna diversity schemes to improve communication quality and reliability between base stations 102 and wireless devices 104. Additionally, or alternatively, the base stations 102 and/or the wireless devices 104 can employ multiple-input, multiple-output (MIMO) techniques that can take advantage of multi-path environments to transmit multiple spatial layers carrying the same or different coded data.

In some examples, the network 100 implements 6G technologies including increased densification or diversification of network nodes. The network 100 can enable terrestrial and non-terrestrial transmissions. In this context, a Non-Terrestrial Network (NTN) is enabled by one or more satellites, such as satellites 116-1 and 116-2, to deliver services anywhere and anytime and provide coverage in areas that are unreachable by any conventional Terrestrial Network (TN). A 6G implementation of the network 100 can support terahertz (THz) communications. This can support wireless applications that demand ultrahigh quality of service (QOS) requirements and multi-terabits-per-second data transmission in the era of 6G and beyond, such as terabit-per-second backhaul systems, ultra-high-definition content streaming among mobile devices, AR/VR, and wireless high-bandwidth secure communications. In another example of 6G, the network 100 can implement a converged Radio Access Network (RAN) and Core architecture to achieve Control and User Plane Separation (CUPS) and achieve extremely low user plane latency. In yet another example of 6G, the network 100 can implement a converged Wi-Fi and Core architecture to increase and improve indoor coverage.

5G Core Network Functions

Figure 2:
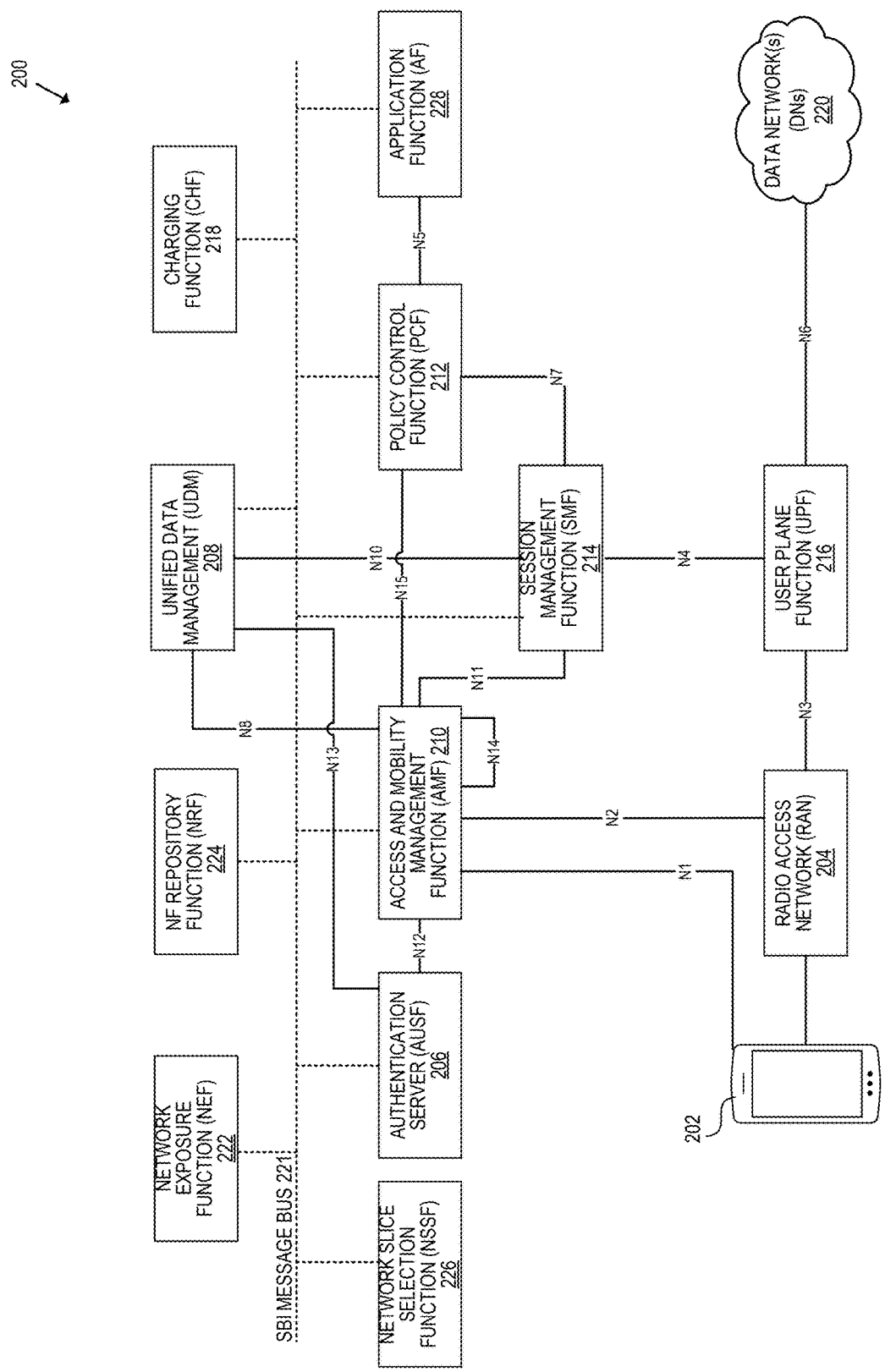
FIG. 2 is a block diagram that illustrates an architecture including core network functions (NFs) that can implement aspects of the present technology.

FIG. 2 is a block diagram that illustrates an architecture 200 including 5G core network functions (NFs) that can implement aspects of the present technology. A wireless device 202 can access the 5G network through a NAN (e.g., gNB) of a RAN 204. The RAN 204 can provide either wired access or wireless access to communication devices. The NFs include an Authentication Server Function (AUSF) 206, a Unified Data Management (UDM) 208, an Access and Mobility management Function (AMF) 210, a Policy Control Function (PCF) 212, a Session Management Function (SMF) 214, a User Plane Function (UPF) 216, and a Charging Function (CHF) 218.

The interfaces N1 through N15 define communications and/or protocols between each NF as described in relevant standards. The UPF 216 is part of the user plane and the AMF 210, SMF 214, PCF 212, AUSF 206, and UDM 208 are part of the control plane. One or more UPFs can connect with one or more data networks (DNs) 220. The UPF 216 can be deployed separately from control plane functions. The NFs of the control plane are modularized such that they can be scaled independently. As shown, each NF service exposes its functionality in a Service Based Architecture (SBA) through a Service Based Interface (SBI) 221 that uses HTTP/2. The SBA can include a Network Exposure Function (NEF) 222, an NF Repository Function (NRF) 224, a Network Slice Selection Function (NSSF) 226, and other functions such as a Service Communication Proxy (SCP).

The SBA can provide a complete service mesh with service discovery, load balancing, encryption, authentication, and authorization for interservice communications. The SBA employs a centralized discovery framework that leverages the NRF 224, which maintains a record of available NF instances and supported services. The NRF 224 allows other NF instances to subscribe and be notified of registrations from NF instances of a given type. The NRF 224 supports service discovery by receipt of discovery requests from NF instances and, in response, details which NF instances support specific services.

The NSSF 226 enables network slicing, which is a capability of 5G to bring a high degree of deployment flexibility and efficient resource utilization when deploying diverse network services and applications. A logical end-to-end (E2E) network slice has predetermined capabilities, traffic characteristics, and service-level agreements and includes the virtualized resources required to service the needs of a Mobile Virtual Network Operator (MVNO) or group of subscribers, including a dedicated UPF, SMF, and PCF. The wireless device 202 is associated with one or more network slices, which all use the same AMF. A Single Network Slice Selection Assistance Information (S-NSSAI) function operates to identify a network slice. Slice selection is triggered by the AMF, which receives a wireless device registration request. In response, the AMF retrieves permitted network slices from the UDM 208 and then requests an appropriate network slice of the NSSF 226.

The UDM 208 introduces a User Data Convergence (UDC) that separates a User Data Repository (UDR) for storing and managing subscriber information. As such, the UDM 208 can employ the UDC under the Third-Generation Partnership Project (3GPP) Technical Specification 22.101 to support a layered architecture that separates user data from application logic. The UDM 208 can include a stateful message store to hold information in local memory or can be stateless and store information externally in a database of the UDR. The stored data can include profile data for subscribers and/or other data that can be used for authentication purposes. Given a large number of wireless devices that can connect to a 5G network, the UDM 208 can contain voluminous amounts of data that is accessed for authentication. Thus, the UDM 208 is analogous to a Home Subscriber Server (HSS) and the AUSF can provide authentication credentials while being employed by the AMF 210 and SMF 214 to retrieve subscriber data and context.

The PCF 212 can connect with one or more Application Functions (AFs) 228. The PCF 212 supports a unified policy framework within the 5G infrastructure for governing network behavior. The PCF 212 accesses the subscription information required to make policy decisions from the UDM 208 and then provides the appropriate policy rules to the control plane functions so that they can enforce them. The SCP (not shown) provides a highly distributed multi-access edge compute cloud environment and a single point of entry for a cluster of NFs once they have been successfully discovered by the NRF 224. This allows the SCP to become the delegated discovery point in a datacenter, off-loading the NRF 224 from distributed service meshes that make up a network operator's infrastructure. Together with the NRF 224, the SCP forms the hierarchical 5G service mesh.

The AMF 210 receives requests and handles connection and mobility management while forwarding session management requirements over the N11 interface to the SMF 214. The AMF 210 determines that the SMF 214 is best suited to handle the connection request by querying the NRF 224. That interface and the N11 interface between the AMF 210 and the SMF 214 assigned by the NRF 224 use the SBI 221. During session establishment or modification, the SMF 214 also interacts with the PCF 212 over the N7 interface and the subscriber profile information stored within the UDM 208. Employing the SBI 221, the PCF 212 provides the foundation of the policy framework that, along with the more typical QoS and charging rules, includes network slice selection, which is regulated by the NSSF 226.

Large Language Model (LLM) Based Code Injection Prevention

Figure 3:
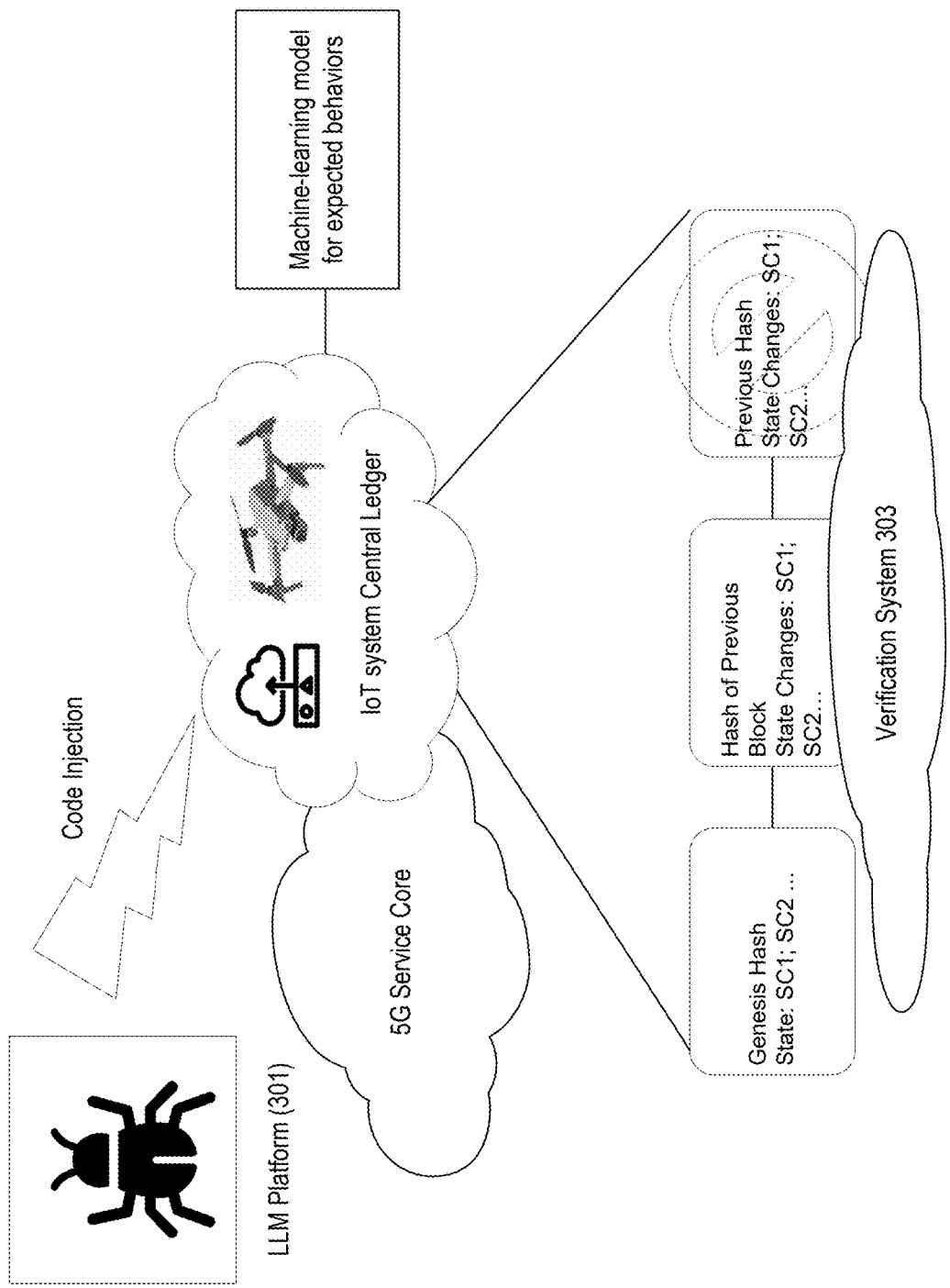
FIG. 3 illustrates an example architecture having a verification system in accordance with one or more embodiments of the present technology.

FIG. 3 illustrates an example architecture having a verification system in accordance with one or more embodiments of the present technology. As shown in FIG. 3, an AI-based hacker platform 301 can infiltrate the application layer (also referred to as Layer 7) of an IoT device by injecting AI-generated malicious code. The infiltrated application layer is modified to provide false information about the system that is transmitted through various lower layers of the network. The infiltrated application layer can also operate the IoT devices in a malicious way that is inconsistent with the expected behaviors. The verification system 303 can be implemented to timely detect the infiltration of the application layers and prevent such attacks.

Figure 4:
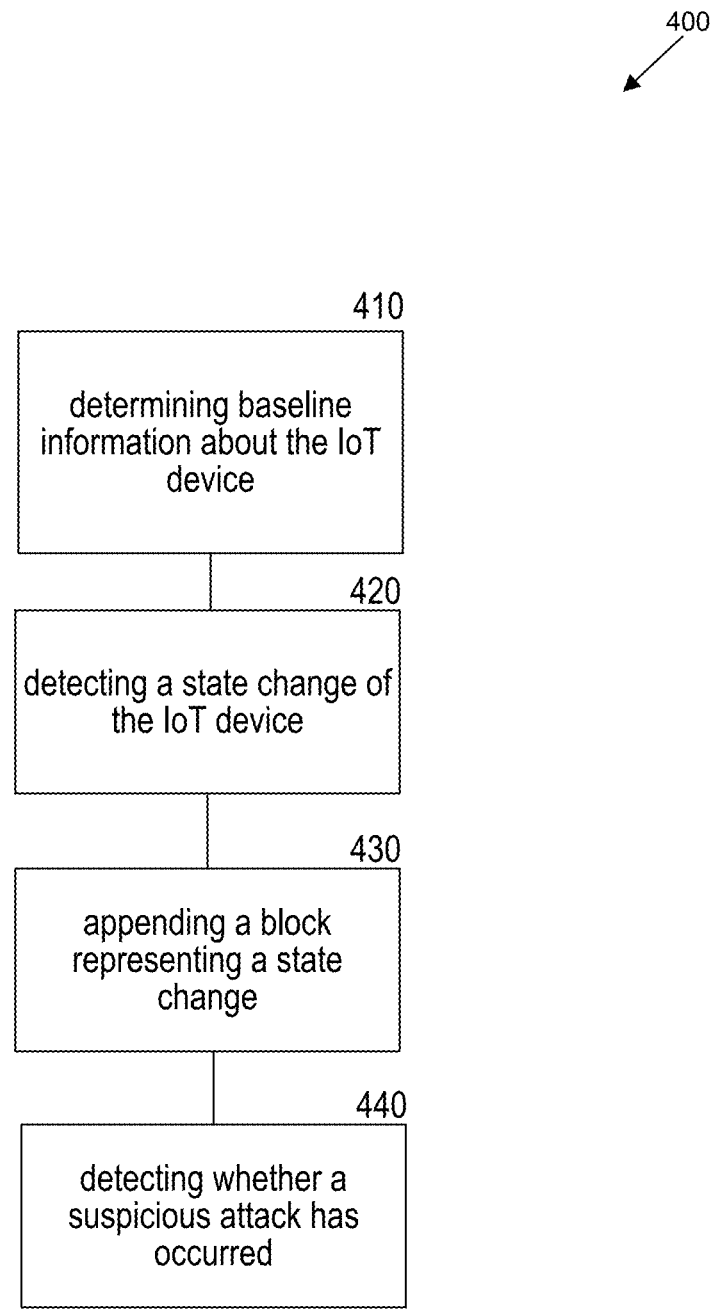
FIG. 4 is a flowchart representation of a method for detecting a code injection activity by a machine learning platform in accordance with one or more embodiments of the present technology.

The verification system can be implemented at least partially as a Layer 7 application that is deployed to the IoAT device. In some embodiments, an Internet-of-Things (IoT) device that requests an initial connection with a network is first authenticated by the network and then certified, either by the verification system or a third-party certification service. The verification system can monitor the status of the IoAT device for the detection of the malicious attacks. FIG. 4 is a flowchart representation of a method for detecting a code injection activity by a machine learning platform in accordance with one or more embodiments of the present technology. The method 400 includes, at operation 410, determining, by a verification system, baseline information about an Internet-of-Things (IoT) device. The baseline information comprises information about a first aspect of the IoT device, the first aspect represented by at least a value corresponding a compiled binary code of the IoT device, and information about a second aspect of the IoT device representing an expected behavior of the IoT device. The method 400 includes, at operation 420, detecting a state change of the IoT device. The state change comprises at least one of: a change to the compiled binary code of the IoT device or a change to interpreted code run on the IoT device. The method 400 includes, at operation 430, responsive to the state change of the IoT device, appending, by the verification system, a current-state block representing the state change to a prior-state block representing a previous state of the IoT device in a blockchain. The current-state block comprises a payload that carries information corresponding to at least one of the first aspect or the second aspect of the IoT device. The method 400 includes, at operation 440, detecting whether a suspicious attack has occurred by comparing the payload of the current-state block to the baseline information.

When an IoAT device seeks to establish a connection with the network, the verification system can communicate with the core network to allow the network to authenticate the IoAT device. The verification system can also obtain information, from the IoAT device itself and/or the core network, to establish a baseline indicating the expected behavior associated with this type of devices.

The baseline can include information of at least two aspects of the IoAT device. The first aspect includes attributes or data of the IoAT device that is not expected to change often, such as compiled code/image of the operating system (OS) (e.g., kernel mode components) and/or certain sub-systems of the IoAT devices (e.g., user mode drivers, software components for the essential functions). Changes to the first aspect are often done through verified or certified updates. The second aspect includes attributes or data that changes but is still expected to follow expected patterns of behaviors. For example, the input/output (IO) data changes but the data typically follows an expected set of formats. Similarly, invocation of internal or external functions or interfaces (e.g., function calls) is expected to follow a certain pattern. As another example, the response time or the latency time of a particular function or a particular set of function calls is expected to be within a range.

To detect malicious code injections that alter the behavior of the IoAT devices, the verification system can track the state of the IoAT device to determine any unexpected deviation has occurred. Once the IoAT device is authenticated by the network (e.g., having the appropriate user credentials and/or in a known, initial authorized state), the verification system certifies the IoAT devices and issues a certification signature. The certification can also be performed by a third-party certification service. Upon certification of the IoAT device application in its initial state, the verification system can create a control chain register to track the state of the IoAT device. The control chain register can be considered as a local ledger that effectively reflects the expected state of the IoAT device, including its operating system and the software components that run on the device. The control chain register can also be part of a central ledger stored in the network.

Figure 5:
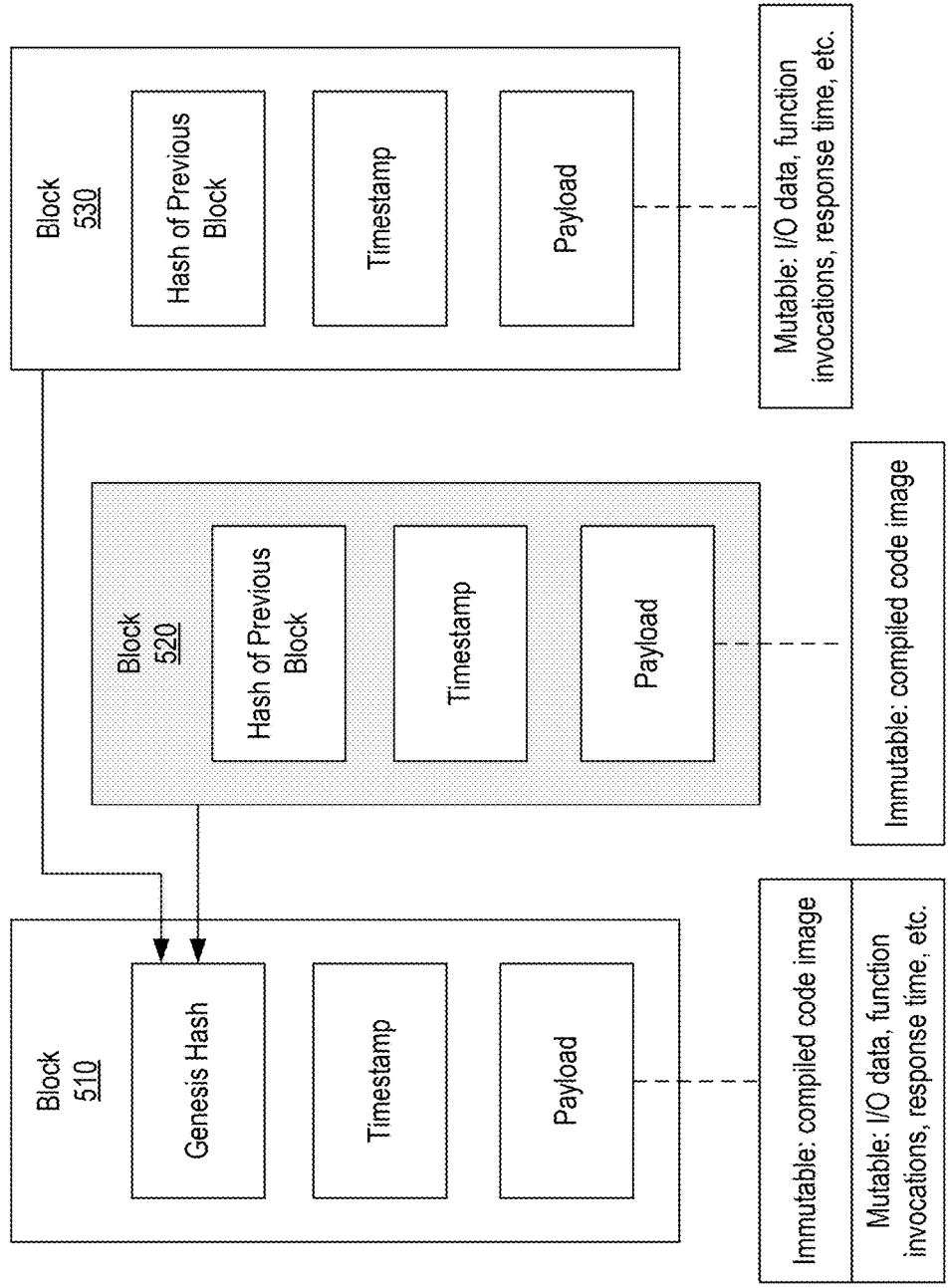
FIG. 5 illustrates an example ledger for tracking a state of a device in accordance with one or more embodiments of the present technology.

FIG. 5 illustrates an example ledger for tracking a state of an IoAT device in accordance with one or more embodiments of the present technology. An initial block 510 can be generated to represent the initial state of the authorized IoAT device after determining the baseline information about the IoAT device. The initial block 510 can include the certification signature as its hash value (e.g., a genesis hash). The initial block 510 can also include a payload that reflects the compiled binary code of the kernel and/or user mode sub-systems. For example, a value (e.g., a hash value) corresponding to the compiled binary image on the IoAT device can be included in the payload to represent the baseline of the code aspect of the IoAT device. As another example, expected outputs, such as expected data formats, value ranges, invocation of application programming interfaces, etc., can also be used as part of the baseline indicating the mutable aspect of the IoAT device.

Every time the IoT device undergoes a state change (e.g., when data is created or modified by the certified IoAT device, or when the operation system and/or software components of the IoAT device encounters changes), the verification system can generate a subsequent block The subsequent block includes a hash value representing the state change. FIG. 5 illustrates an example block 520 that is generated after the initial block. In some embodiments, the block 520 includes a timestamp indicating the time at which the state change occurs. The verification system then checks the subsequent block to ensure integrity of the IoAT device. Based on the baseline information, the verification system can determine whether the subsequent block representing a state change is valid. Upon the successful verification of the block(s), the control chain register continues to grow, with blocks appended to the end of the chain for various changes.

The AI-based hacker systems attack by intrusive actions such as replacing or supplementing the compiled or interpreted code of the IoAT device, and/or replacing or supplementing the output generated by the IoAT device. For example, the AI-based hacker system may alter the kernel or sub-systems of the IoAT device. A modification of the deployed software components deviates from the baseline information obtained by the verification system. As shown in FIG. 5, the block 520 is generated to represent a modification or replacement of the kernel code. However, such state change results in a different hash value of the compiled binary code on the IoAT device, which can be promptly detected by the verification system. The verification system can check and determine if the change comes from a verified or certified system update. If not, the block 520 is marked as an invalid block in the control chain register. Upon detecting that block 520 is invalid, the verification system can choose to hibernate this IoAT device, with the assumption that the IoAT device is under active attack by an AI-based hacker system. The verification system can also revert the state change to the previous valid block in the control chain register. For example, if the attack deletes certain portions of the kernel or sub-systems on the IoAT device, the verification system can quickly revert the state of the IoAT device to a previous valid state to minimize the impact on the functions of the device (e.g., in this case, the initial state of the IoAT device represented by initial block 510).

In some embodiments, in addition to the Layer 7 application, the verification system also includes a service component in the network (e.g., implemented as a cloud service or a network function using a network node that comprises at least one processor). The Layer 7 part of the verification system can be configured to handle the code aspect of the IoT device to reduce processing complexity on the local processor(s). Detection of changes of the I/O data and function calling in the IoT device can be accomplished by the service component of the verification system. In some embodiments, a machine learning model such as shown in FIG. 3 can be trained to model the expected behaviors of various types of IoAT devices. The Layer 7 application of the verification system can be in communication with the service component to transmit information about the local control chain register to the network.

In some embodiments, the application layer component can monitor information of the device (e.g., behavior, performance, and/or internal processes) and create a detailed local profile for its expected behavior. The service layer component in the network can monitor communication-related information, such as information transmitted from the device to the network and back, that may not necessarily be accessible from the device itself. Analyzing the communication-related information requires more extensive computational resources/analytics to detect anomalies. Therefore, allocating this part of the analysis to the service layer component can minimize the impact of performance and power on the device itself.

In some embodiments, the machine learning model can be trained to collect data from the application layer and the service layer. A continuous verification of incoming data by comparing the payload of the current state data with the device's expected behavior can be performed to detect anomalies. In some embodiments, the model triggers an action (e.g., raise an alert, send a notification) when a certain threshold is met or exceeded.

Referring to FIG. 5, the Layer 7 application generates another block 530 to represent a new state change of the IoAT device. The block 530 includes a timestamp indicating the time at which the state change occurs and a payload representing the change (e.g., the interpreted code of the IoAT device has some changes). A short value (e.g., a hash code) corresponding to compiled code is not expected to change. Once the compiled code is deployed or updated via a certified system update, it is easy to compare the short value or even the binary image directly to determine if any expected changes have been made to the compiled code. However, changes are expected in the interpreted code (e.g., different passes of interpretations may generate slightly different code that performs the same function). Due to the difference in the compiled code versus the interpreted code, the Layer 7 application cannot immediately determine whether the state change is caused by a certified system change. The Layer 7 application proceeds to generate a short value (e.g., a hash code) that corresponds to the change and stores the short value as the payload. The Layer 7 application then transmits detailed information that reflects the change to the service component (e.g., the device response time/latency time to selected functions after the change).

Figure 6:
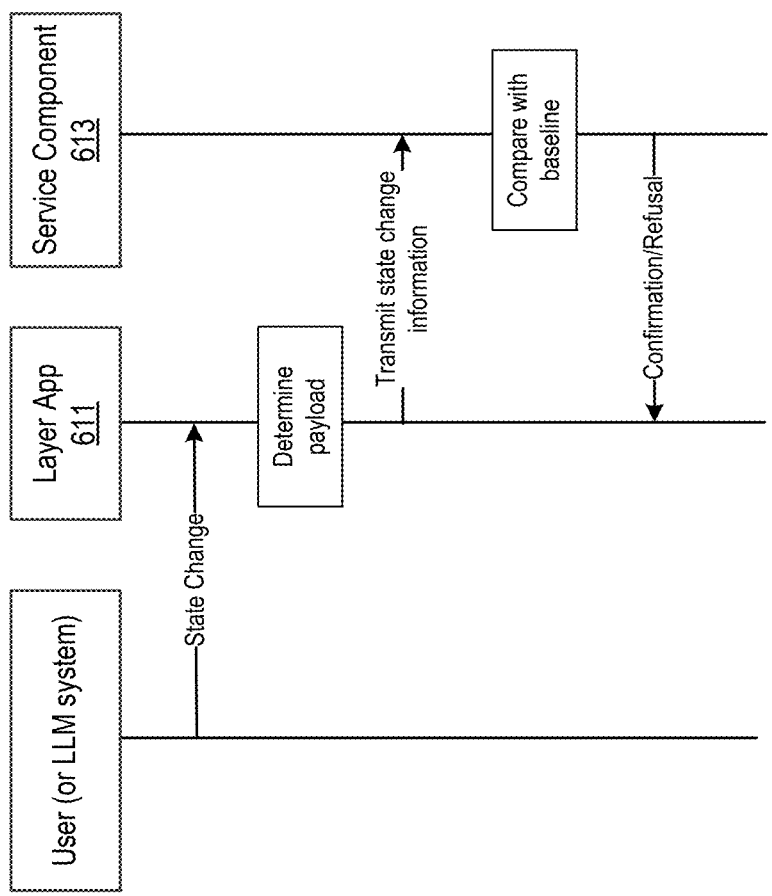
FIG. 6 illustrates a sequence chart showing information exchange between an example Layer 7 application and an example service component of the verification system in accordance with one or more embodiments of the present technology.

FIG. 6 illustrates a sequence chart showing information exchange between an example Layer 7 application and an example service component of the verification system in accordance with one or more embodiments of the present technology. As shown in FIG. 6, the Layer 7 App 611 transmits detailed information about the state change to the service component 613 after determining a short value as the payload locally. The service component 613 then compares the detailed information to the baseline (e.g., predicted/expected behavior of the IoAT device). When the difference in behavior exceeds a threshold (e.g., an actual response time is 1 s, while the expected response time is 0.05 s, exceeding a threshold of 0.01 s), the service component of the verification system can determine that a suspicious change to the IoAT device has been made and indicate that the corresponding block should be marked as invalid (e.g., in a refusal message). In this particular example, the service component 613 determines that the state change aligns with the expected behavior of the IoAT device and transmits a confirmation message to the Layer 7 application 611. The Layer 7 application 611 then proceeds to append the block to the control chain register as a valid block (e.g., block 530 as shown in FIG. 5).

In some embodiments, the state of the IoAT device can be tracked using a combination of local and centralized ledgers in the blockchain format. Referring back to FIG. 3, in some embodiments, the control chain register is a distributed part of the IoAT device ledger stored in the central ledger. In some embodiments, a block in the central ledger is associated with a root hash indicating the accumulated state changes of the IoAT device so far. In some embodiments, the central ledger can include the valid blocks of the IoAT device, leaving the invalid blocks to Layer 7 application to handle as part of the distributed local control chain register. In those cases, upon detecting a suspicious state change, the verification system can query the central ledger for a valid state (e.g., a valid block) in a reference chain stored in the central ledger for a proper restoration of the device state.

The control chain register and/or the central ledger enable the capability to quickly revert the IoAT system to a valid state, particularly when the IoAT system is executing a time-sensitive task and cannot be put in a hibernated state immediately. The control chain register and/or the central ledger also enable accurate tracking of the attack activities. For example, when multiple attacks happen, the invalid blocks include information such as the timestamps for the potential attacks and the content of the attacks (e.g., how the behavior of the IoAT device is changed). The invalid blocks thus provide information to reconstruct the attacking behavior of the AI-based hacker systems. The understanding of the attacking behavior can also help improve future defense mechanisms.

Referring back to FIG. 4, in some embodiments, the method includes generating, by the verification system, an initial block of a blockchain. The initial block represents an initial state of the IoT device upon the IoT device being connected to a network. In some embodiments, the method includes obtaining a certification signature of the IoT device by the verification system upon authentication of the IoT device. In some embodiments, the method includes hibernating the IoT device upon detecting that the suspicious attack has occurred. In some embodiments, the method includes reverting the IoT device to a prior valid state upon detecting that the suspicious attack has occurred.

In some embodiments, the current-state block comprises a timestamp indicating a time at which the state change has occurred. The payload indicating a state of the IoT device corresponding to the timestamp. In some embodiments, the information about the second aspect of the IoT device comprises at last one of: a format of an input or output data, a range of an input or output date, a pattern of invocation of internal or external functions, a response time associated with an operation, or a latency time associated with an operation.

In some embodiments, the verification system comprises an application layer component deployed on the IoT device, and a service component deployed in a network. In some embodiments, wherein the application layer component is configured to monitor the information about the first aspect of the IoT device, and the service component is configured to monitor the information about the second aspect of the IoT device. In some embodiments, the method includes determining, via a machine-learning model deployed as part of the service component, that a suspicious attack has occurred upon a difference between the payload of the current-state block and the expected behavior of the IoT device exceeding a predetermined threshold. In some embodiments, the method includes obtaining a valid state of the IoT device by querying a reference blockchain stored in a network.

Figure 7:
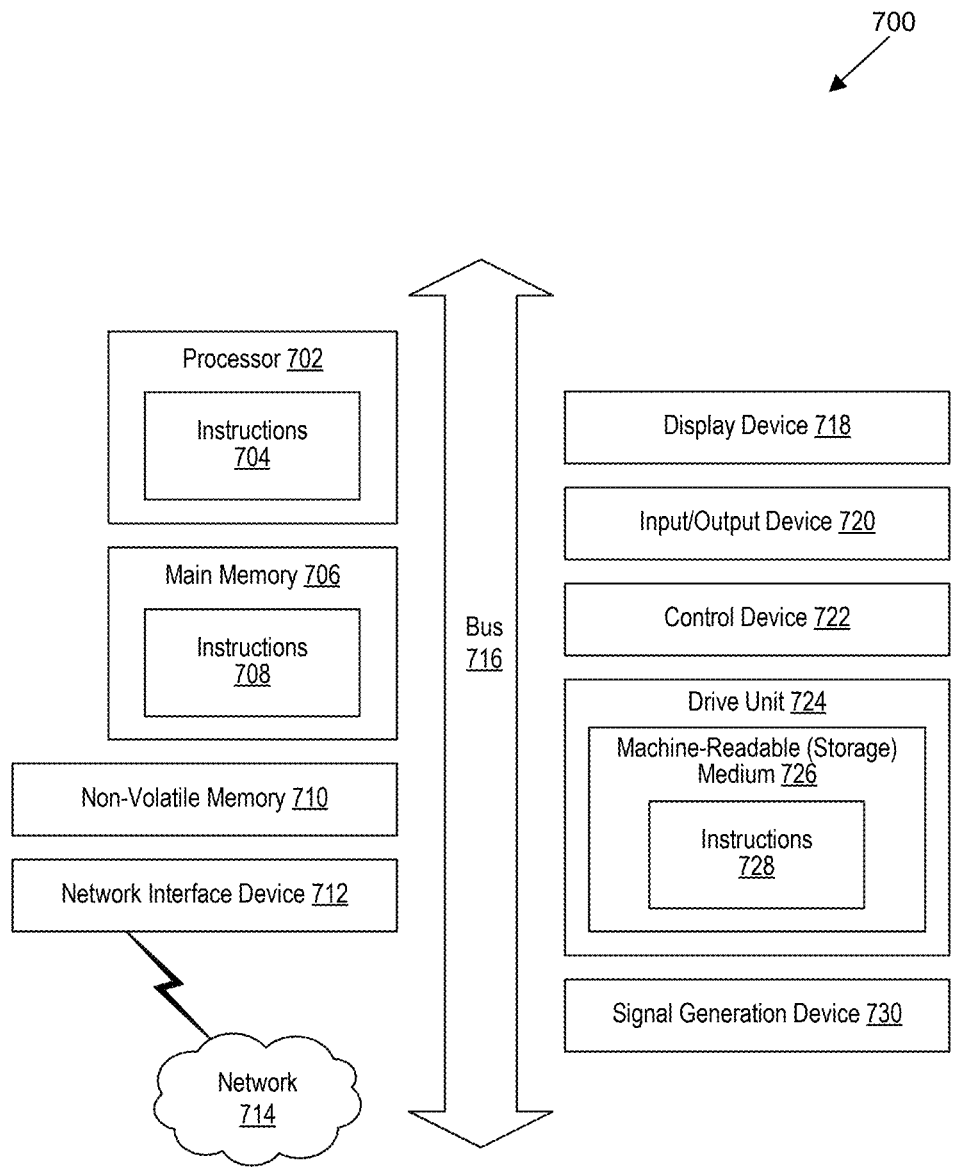
FIG. 7 is a block diagram that illustrates an example of a computer system in which at least some operations described herein can be implemented.

FIG. 7 is a block diagram that illustrates an example of a computer system 700 in which at least some operations described herein can be implemented. As shown, the computer system 700 can include one or more processors 702, main memory 706, non-volatile memory 710, a network interface device 712, a video display device 718, an input/output device 720, a control device 722 (e.g., keyboard and pointing device), a drive unit 724 that includes a machine-readable (storage) medium 726, and a signal generation device 730 that are communicatively connected to a bus 716. The bus 716 represents one or more physical buses and/or point-to-point connections that are connected by appropriate bridges, adapters, or controllers. Various common components (e.g., cache memory) are omitted from FIG. 7 for brevity. Instead, the computer system 700 is intended to illustrate a hardware device on which components illustrated or described relative to the examples of the FIG. s and any other components described in this specification can be implemented.

The computer system 700 can take any suitable physical form. For example, the computing system 700 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computing system 700. In some implementations, the computer system 700 can be an embedded computer system, a system-on-chip (SOC), a single-board computer system (SBC), or a distributed system such as a mesh of computer systems, or it can include one or more cloud components in one or more networks. Where appropriate, one or more computer systems 700 can perform operations in real-time, in near real-time, or in batch mode.

The network interface device 712 enables the computing system 700 to mediate data in a network 714 with an entity that is external to the computing system 700 through any communication protocol supported by the computing system 700 and the external entity. Examples of the network interface device 712 include a network adapter card, a wireless network interface card, a router, an access point, a wireless router, a switch, a multilayer switch, a protocol converter, a gateway, a bridge, a bridge router, a hub, a digital media receiver, and/or a repeater, as well as all wireless elements noted herein.

The memory (e.g., main memory 706, non-volatile memory 710, machine-readable medium 726) can be local, remote, or distributed. Although shown as a single medium, the machine-readable medium 726 can include multiple media (e.g., a centralized/distributed database and/or associated caches and servers) that store one or more sets of instructions 728. The machine-readable medium 726 can include any medium that is capable of storing, encoding, or carrying a set of instructions for execution by the computing system 700. The machine-readable medium 726 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory 710, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 704, 708, 728) set at various times in various memory and storage devices in computing device(s). When read and executed by the processor 702, the instruction(s) cause the computing system 700 to perform operations to execute elements involving the various aspects of the disclosure.

REMARKS

The terms "example," "embodiment," and "implementation" are used interchangeably. For example, references to "one example" or "an example" in the disclosure can be, but not necessarily are, references to the same implementation; and such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described that can be exhibited by some examples and not by others. Similarly, various requirements are described that can be requirements for some examples but not for other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense—that is to say, in the sense of "including, but not limited to." As used herein, the terms "connected," "coupled," and any variants thereof mean any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number, respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a means-plus-function claim will use the words "means for." However, the use of the term "for" in any other context is not intended to invoke a similar interpretation. The applicant reserves the right to pursue such additional claim forms either in this application or in a continuing application.

The invention claimed is:

1. A A method for detecting code injection activity in Internet-of-Things (IoT) devices by a machine learning based platform comprising:
   determining, by a verification system, baseline information about an IoT device,
      wherein the baseline information comprises:
         information about a first aspect of the IoT device, the first aspect represented by at least a value corresponding to a compiled binary code of the IoT device, and
         information about a second aspect of the IoT device representing an expected behavior of the IoT device;
   detecting a state change of the IoT device, wherein the state change comprises at least one of: a change to the compiled binary code of the IoT device or a change to interpreted code run on the IoT device;

responsive to the state change of the IoT device, appending, by the verification system, a current-state block representing the state change to a prior-state block representing a previous state of the IoT device in a blockchain,
   wherein the current-state block comprises a payload that carries information corresponding to at least one of the first aspect or the second aspect of the IoT device; and
detecting whether a suspicious attack has occurred by comparing the payload of the current-state block to the baseline information.

2. The method of claim 1, comprising:
generating, by the verification system, an initial block of a blockchain,
wherein the initial block represents an initial state of the IoT device upon the IoT device being connected to a network.

3. The method of claim 1, comprising:
obtaining a certification signature of the IoT device by the verification system upon authentication of the IoT device.

4. The method of claim 1, comprising:
hibernating the IoT device upon detecting that the suspicious attack has occurred.

5. The method of claim 1, comprising:
reverting the IoT device to a prior valid state upon detecting that the suspicious attack has occurred.

6. The method of claim 1, wherein the current-state block comprises a timestamp indicating a time at which the state change has occurred,
   wherein the payload indicates a state of the IoT device corresponding to the timestamp.

7. The method of claim 1, wherein the information about the second aspect of the IoT device comprises at last one of: a format of an input or output data, a range of an input or output date, a pattern of invocation of internal or external functions, a response time associated with an operation, or a latency time associated with an operation.

8. The method of claim 1, wherein the verification system comprises an application layer component deployed on the IoT device, and a service component deployed in a network.

9. The method of claim 8, wherein the application layer component is configured to monitor the information about the first aspect of the IoT device, and
   wherein the service component is configured to monitor the information about the second aspect of the IoT device.

10. The method of claim 9, further comprising:
determining, via a machine-learning model deployed as part of the service component, that a suspicious attack has occurred upon a difference between the payload of the current-state block and the expected behavior of the IoT device exceeding a predetermined threshold.

11. The method of claim 1, comprising:
obtaining a valid state of the IoT device by querying a reference blockchain stored in a network.

12. A non-transitory, computer-readable storage medium comprising instructions for detecting code injection activity in Internet-of-Things (IoT) devices by a machine learning based platform that, when executed by at least one processor of a system, cause the system to:
determine baseline information about an IoT device, wherein the baseline information comprises:
   information about a first aspect of the IoT device, the first aspect represented by at least a value corresponding to a compiled binary code of the IoT device, and
   information about a second aspect of the IoT device representing an expected behavior of the IoT device;
detect a state change of the IoT device, wherein the state change comprises at least one of: a change to the compiled binary code of the IoT communication device or a change to interpreted code run on the IoT communication device;
append, responsive to the state change of the IoT device, a current-state block representing the state change to a prior-state block representing a previous state of the IoT device in a blockchain,
   wherein the current-state block comprises a payload that carries information corresponding to at least one of the first aspect or the second aspect of the IoT device; and
detect whether a suspicious attack has occurred by comparing the payload of the current-state block to the baseline information.

13. The non-transitory, computer-readable storage medium of claim 12, wherein the instructions cause the system to:
generate an initial block of a blockchain,
   wherein the initial block represents an initial state of the IoT device upon the IoT device being connected to a network.

14. The non-transitory, computer-readable storage medium of claim 12, wherein the instructions cause the system to:
obtain a certification signature to the IoT device upon authentication of the IoT device.

15. The non-transitory, computer-readable storage medium of claim 12, wherein the instructions cause the system to:
hibernate the IoT device or revert the IoT device to a prior valid state upon detecting that suspicious attack has occurred.

16. The non-transitory, computer-readable storage medium of claim 12, wherein the information about the second aspect of the IoT device comprises at last one of: a format of an input or output data, a range of an input or output date, a pattern of invocation of internal or external functions, a response time associated with an operation, or a latency time associated with an operation.

17. A system for detecting code injection activity in Internet-of-Things (IoT) devices by a machine learning based platform comprising:
at least one processor; and
a non-transitory, computer-readable storage medium comprising instructions recorded thereon that, when executed by the at least one processor, cause the system to:
determine baseline information about an Internet-of-Things (IoT) device,
   wherein the baseline information comprises:
      information about a first aspect of the IoT device, the first aspect represented by at least a value corresponding to a compiled binary code of the IoT device, and
      information about a second aspect of the IoT device representing an expected behavior of the IoT device;
detect a state change of the IoT device, wherein the state change comprises at least one of: a change to the compiled binary code of the IoT device or a change to interpreted code run on the IoT device;

responsive to the state change of the IoT device, append a current-state block representing the state change to a prior-state block representing a previous state of the IoT device in a blockchain,
  wherein the current-state block comprises a payload that carries information corresponding to at least one of the first aspect or the second aspect of the IoT device; and detecting whether a suspicious attack has occurred by comparing the payload of the current-state block to the baseline information.

18. The system of claim 1, wherein the instructions cause the system to:
  generate an initial block of a blockchain,
  wherein the initial block represents an initial state of the IoT device upon the IoT device being connected to a network.

19. The system of claim 17, wherein the instructions cause the system to:
  obtain a certification signature of the IoT device by the verification system upon authentication of the IoT device.

20. The system of claim 17, wherein the instructions cause the system to:
  hibernate the IoT device upon detecting that the suspicious attack has occurred.

\* \* \* \* \*